(12) United States Patent  (10) Patent No.: US 7,618,184 B2
Gosis et al.  (45) Date of Patent: Nov. 17, 2009

(54) SYSTEM AND METHOD FOR MULTIPLE-TEMPERATURE INDICATOR STICK

(75) Inventors: Anatoly Gosis, Palatine, IL (US); Shannon B. Reading, Easton, PA (US); Joseph E. Fabin, Elmwood Park, IL (US); Frank Otte, Mount Prospect, IL (US)

(73) Assignee: Illinois Tool Works, Glenview, IL (US)

( * ) Notice: Subject to any disclaimer, the term of this patent is extended or adjusted under 35 U.S.C. 154(b) by 173 days.

(21) Appl. No.: 11/556,376

(22) Filed: Nov. 3, 2006

(65) Prior Publication Data

US 2008/0107153 A1   May 8, 2008

(51) Int. Cl.
*G01K 11/06* (2006.01)
*G01K 11/12* (2006.01)

(52) U.S. Cl. .................... 374/160; 374/162; 374/139

(58) Field of Classification Search ............. 374/17–20, 374/52, 137, 141, 157, 159–162, 190, 192–193, 374/195–196, E15.002, E5.031, E11.006, 374/E11.007, E11.018, E11.024, E1.002, 374/140
See application file for complete search history.

(56) References Cited

U.S. PATENT DOCUMENTS

| 1,603,713 | A | | 10/1926 | Peterson | |
| 1,983,728 | A | | 12/1934 | Bafetti | |
| 2,020,676 | A | | 11/1935 | Ellis et al. | |
| 3,785,336 | A | | 1/1974 | Roszkowski | |
| 3,935,743 | A | * | 2/1976 | Brodie et al. | 374/151 |
| 4,075,035 | A | * | 2/1978 | Trevedy | 136/210 |
| 4,120,818 | A | * | 10/1978 | Swindells et al. | 116/207 |
| 4,436,032 | A | * | 3/1984 | van Ouwerkerk | 101/120 |
| 4,554,565 | A | * | 11/1985 | Kito et al. | 503/201 |
| 4,875,782 | A | * | 10/1989 | Fox | 374/148 |
| 5,011,445 | A | | 4/1991 | Nakasuji et al. | |
| 5,318,372 | A | | 6/1994 | Besthorne | |
| 5,401,100 | A | * | 3/1995 | Thackston et al. | 374/208 |
| D360,223 | S | | 7/1995 | Lamber | |
| 5,499,597 | A | * | 3/1996 | Kronberg | 116/216 |
| 5,622,137 | A | * | 4/1997 | Lupton et al. | 116/217 |
| 5,918,981 | A | * | 7/1999 | Ribi | 374/162 |
| 5,932,318 | A | * | 8/1999 | Uchiyama | 428/195.1 |
| 6,022,648 | A | * | 2/2000 | Jacobson et al. | 430/19 |
| 6,113,520 | A | | 9/2000 | Greiner | |
| 6,228,804 | B1 | * | 5/2001 | Nakashima | 503/226 |
| 6,361,839 | B1 | * | 3/2002 | Salgado et al. | 428/32.6 |

(Continued)

OTHER PUBLICATIONS

PCT International Search Report dated Jan. 17, 2008.

(Continued)

*Primary Examiner*—Patrick J Assouad
*Assistant Examiner*—Bret Adams
(74) *Attorney, Agent, or Firm*—Quarles & Brady LLP

(57) ABSTRACT

A system and method for a multi-temperature indicator stick. The multi-temperature indicator stick includes an elongated stick configured to indicate two or more predetermined temperatures. The elongated stick includes a first temperature indication material configured to indicate a first predetermined temperature upon being subjected to the first predetermined temperature. The elongated stick also includes a second temperature indication material configured to indicate a second predetermined temperature upon being subjected to the second predetermined temperature. The first temperature indication material and the second temperature indication material share a common interface extending longitudinally along the elongated stick.

20 Claims, 3 Drawing Sheets

U.S. PATENT DOCUMENTS

| | | | |
|---|---|---|---|
| 6,712,996 B2 * | 3/2004 | Wu et al. | 252/408.1 |
| 6,857,777 B2 | 2/2005 | Desai et al. | |
| 6,960,043 B2 | 11/2005 | Deonarine | |
| 2003/0076868 A1 * | 4/2003 | Desai et al. | 374/160 |
| 2003/0076869 A1 | 4/2003 | Deonarine | |
| 2003/0147450 A1 * | 8/2003 | Witonsky et al. | 374/141 |
| 2004/0240520 A1 * | 12/2004 | Faries et al. | 374/162 |
| 2005/0273126 A1 * | 12/2005 | Beaupre | 606/169 |
| 2006/0008699 A1 * | 1/2006 | Um | 429/90 |
| 2006/0121229 A1 * | 6/2006 | Nagae | 428/40.1 |

OTHER PUBLICATIONS

Tempilstik Temperature Indicators, http://www.tempil.com/productdisplay.asp, product specification guide, Tempil, Inc., South Plainfield, NJ, Aug. 30, 2006.

* cited by examiner

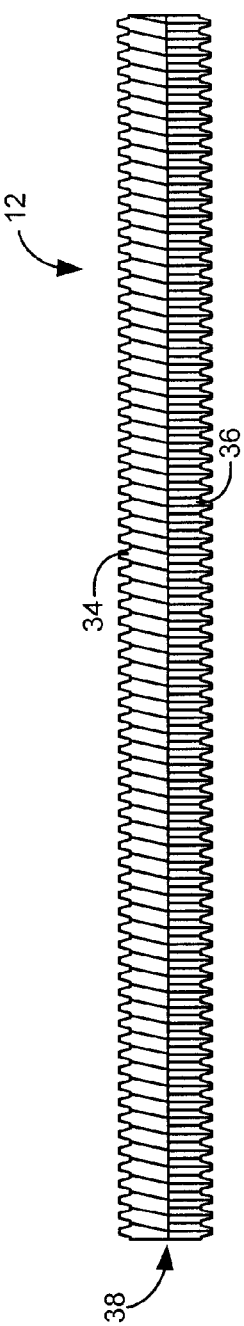
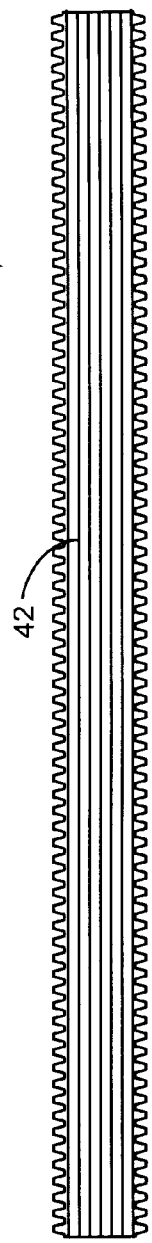
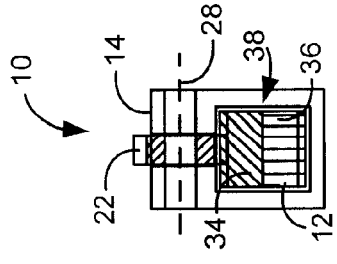
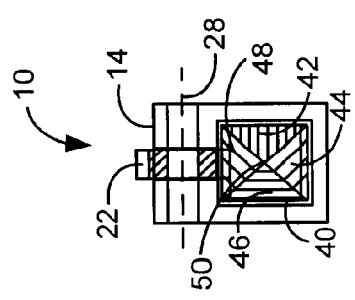

SYSTEM AND METHOD FOR MULTIPLE-TEMPERATURE INDICATOR STICK

REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to temperature indicators and, more particularly, to a system and method for a temperature indicator stick that is capable of indicating multiple temperatures.

Various temperature monitoring or indicating devices are used in the welding, metal fabrication, and heat treatment industries to measure temperatures of materials. Determining surface temperatures is important during welding and metal fabrication processes, such as pre-heat and post-weld heat treatment. Temperature monitoring is also important for determining operating temperatures of various mechanical, electrical, and hydraulic systems and components.

Temperature indicating sticks are commonly used to measure temperature. These temperature indicators are typically formed from compounds or materials designed to undergo a physical and/or chemical change upon being subjected to a particular temperature. An operator uses the temperature indicator stick to mark a desired area and determine that the area has at least reached the particular temperature when the physical/chemical change is observed.

While this system is suitable for many situations, it is often necessary to determine that the temperature of an object is within a specific range. In this case, an operator is required to use two separate temperature indicator sticks: a first stick designed to indicate a temperature representing the low temperature in the desired range and a second stick designed to indicate the high temperature in the desired range. This required use of two or more separate indicator sticks can be particularly cumbersome in the case of the welding, metal fabrication, and heat treatment industries because these industries typically require an operator to wear heat-resistant gloves that significantly impede the ability of the operator to manipulate a variety of temperature indicator sticks simultaneously.

Therefore, it would be desirable to have a system and method for precisely indicating the temperature of an object without the need to simultaneously operate multiple temperature indicator sticks.

BRIEF SUMMARY OF THE INVENTION

The present invention overcomes the aforementioned drawbacks by providing a system and method for marking an object with multiple temperature indicators using a single temperature indicator stick.

In accordance with one aspect of the present invention, a multi-temperature indicator stick is disclosed that includes an elongated stick configured to indicate two or more predetermined temperatures. The elongated stick includes a first temperature indication material configured to indicate a first predetermined temperature upon being subjected to the first predetermined temperature. The elongated stick also includes a second temperature indication material configured to indicate a second predetermined temperature upon being subjected to the second predetermined temperature. The first temperature indication material and the second temperature indication material share a common interface extending longitudinally along the elongated stick.

In accordance with another aspect of the present invention, a method for manufacturing a multi-temperature indicator stick is disclosed that includes forming a first temperature indication material configured to indicate a first predetermined temperature upon being subjected to the first predetermined temperature into a first elongated body. The method also includes forming a second temperature indication material configured to indicate a second predetermined temperature upon being subjected to the second predetermined temperature into a second elongated body. The first elongated body and the second elongated body share a common interface extending longitudinally along the first elongated body and the second elongated body to form a conglomerated stick.

In accordance with yet another aspect of the invention, a temperature indicator stick configured to indicate multiple temperatures is disclosed that includes an elongated stick configured to indicate two or more predetermined temperatures. The elongated stick includes a first temperature indication material configured to undergo a physical change upon being subjected to a first predetermined temperature to indicate the first predetermined temperature. The elongated stick also includes a second temperature indication material configured to undergo a physical change upon being subjected to a second predetermined temperature to indicate the second predetermined temperature. Accordingly, the first temperature indication material and the second temperature indication material extend along a length of the elongated stick.

Various other features of the present invention will be made apparent from the following detailed description and the drawings.

BRIEF DESCRIPTION OF THE SEVERAL VIEWS OF THE DRAWINGS

The invention will hereafter be described with reference to the accompanying drawings, wherein like reference numerals denote like elements, and:

FIG. 2 is a front-elevational view of the temperature indicating system of FIG. 1 including a composite temperature indicator stick configured to indicate two predetermined temperatures;

FIG. 3 is a cross-sectional view of the composite temperature indicator stick of FIG. 2;

FIG. 4 is a front-elevational view of a temperature indicating system including a temperature indicator stick configured to indicate four predetermined temperatures;

FIG. 5 is a cross-sectional view of the composite temperature indicator stick of FIG. 4;

DETAILED DESCRIPTION OF THE INVENTION

Figure 1:
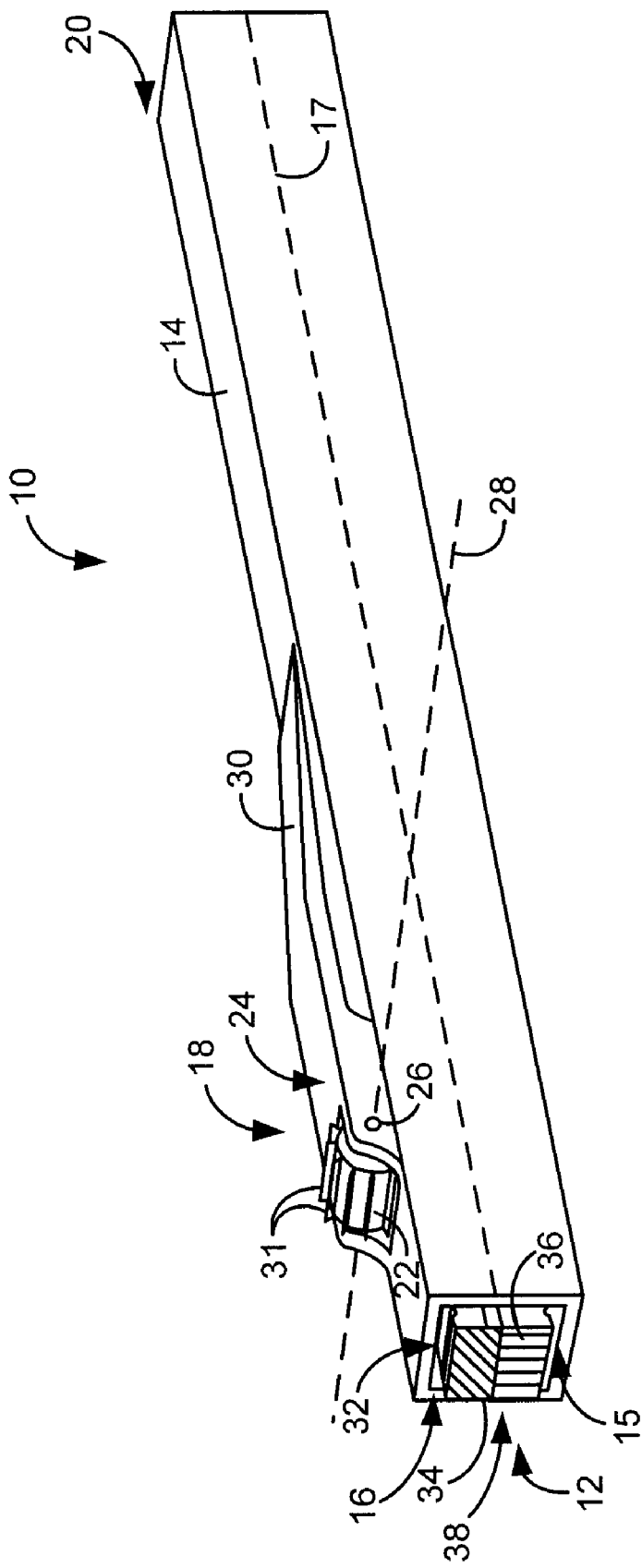
FIG. 1 is a perspective view of a temperature indicating system in accordance with the present invention.

Referring now to FIG. 1, a temperature indicator system 10 includes temperature indicator stick 12 that is arranged at least partially within a housing 14 through an opening 15 formed in the housing 14. In particular, the stick 12 is an elongated member that extends through an interior 16 of the housing 14 along a longitudinal axis 17 of the housing 14. The housing 14 is designed to protect the temperature indicator stick 12 from accidental or superficial damage. As will be described in detail below, the temperature indicator stick 12 is formed from a conglomeration of multiple materials that are designed to undergo physical or chemical changes when subjected to a predetermined temperature to, thereby, indicate the predetermined temperature. For example, the temperature indicator stick 12 may melt or change colors when subjected to a predetermined temperature.

Such temperature indicator sticks 12 are often formed of a relatively brittle or fragile material that is susceptible to cracking, breaking, or other damage. In this regard, the housing 14 may be formed of a ridged material designed to protect the temperature indicator stick 12 from damage. For example, the housing 14 may be formed from a metal, such as aluminum, steel, or brass, or may be a plastic-type material.

A control system 18 is included that extends along a portion of the exterior 20 of the housing 14. The control system 18 is designed to provide easy and accurate control of the position of the temperature indicator stick 12 with respect to the housing 14, even when controlled by a single hand. The control system 18 includes an actuation mechanism in the form of a gear 22 that is supported by a mounting extension 24 that rises above the housing 14. Specifically, the mounting extension 24 supports a pin 26 that extends through opposing sides of the mounting extension 24 to support the gear 22 along a rotational axis 28 extending transversely, and substantially perpendicular, to the longitudinal axis 17 of the housing 14. Hence, the gear 22 extends into the interior 16 of the housing 14 to engage the temperature indicator stick 12 and extends above the housing 14 and mounting extension 24 to allow an operator to easily and accurately control the position of the temperature indicator stick 12 within the housing 14 by rotating the gear 22. Extending from the mounting extension 24, away from the gear 22, is an optional clip 30 that is designed to facilitate mounting the temperature indicator system 10 on clothing or other devices.

The gear 22 includes a plurality of teeth 31 designed to engage a textured portion 32, for example, in the form of teeth that extend along the temperature indicator stick 12. Hence, a rack-and-pinion system is created by the gear 22 and temperature indicator stick 12 that allows a user to easily control positioning of the temperature indicator stick 12 with respect to the housing 14. An operator can accurately control and adjust the position of the indicator stick 12 by rotating the gear 22 toward or away from the opening 15 through which the temperature indicator stick 12 has been loaded into the housing 14. By rotating the gear 22 toward the opening 15, the temperature indicator stick 12 is retracted into the housing 14 and, by rotating the gear 22 away from the opening 15, the temperature indicator stick 12 is extended from the housing 14. Thus, rotation of the gear 22 in a given direction causes reciprocal linear motion by the temperature indicator stick 12. This process can be readily achieved using a single hand.

Referring now to FIGS. 1 through 3, it is contemplated that the temperature indicator stick 12 may be a composite structure formed from two distinct temperature indicating substances. In particular, the temperature indicator stick 12 includes a first temperature indication material 34 configured to indicate a predetermined temperature upon being subjected to the first predetermined temperature and a second temperature indication material 36 configured to indicate a second temperature upon being subjected to the second predetermined temperature. The first temperature indication material 34 and the second temperature indication material 36 share a common interface 38 extending longitudinally along the elongated temperature indicator stick 12. As such, a portion of the first temperature indication material 34 and the second temperature indication material 36 is always presented at each latitudinal cross section of the temperature indicator stick 12, such as when the temperature indicator stick 12 is used and consumed.

Although FIG. 2 shows that the temperature indicator stick 12 is arranged in the housing 14 so that the common interface 38 extends parallel to the rotational axis 28 of the gear 22, it is contemplated that the temperature indicator stick 12 may be arranged in any of a variety of alignments so as to facilitate use of both temperature indication materials 34, 36 as desired by an operator. Furthermore, it is contemplated that the temperature indicator stick 12 may be advantageously used with the above-described temperature indicator system 10 because the above-described temperature indicator system 10 is capable of controlling linear motion of the temperature indicator stick 12 through the housing 14 without rotating the temperature indicator stick 12 and changing the orientation of the common interface with respect to the housing 14. Hence, an operator is not caused to adjust his or her hold of the temperature indicator system 10 to ensure proper depositing of both temperature indication materials 34, 36 to an area simultaneously. However, the temperature indicator stick 12 may be used with any other control and actuation systems or may even be used without any housing, control, or actuation system.

To facilitate easily indicating multiple temperatures or determining when the temperature of an object is within a particular range, it is contemplated that the first temperature indication material 34 and the second temperature indication material 36 are designed to indicate different temperatures. To allow an operator to readily distinguish the two temperature indication materials 34, 36, it is contemplated that the first temperature indication material 34 and the second temperature indication material 36 may be differently colored. In this regard, indication of a predetermined temperature by one of the two temperature indication materials 34, 36 may include melting and/or changing color.

By designing the first temperature indication material 34 and the second temperature indication material 36 to melt and/or change color at differing temperatures, an operator can quickly and easily determine when an object has reached a precise temperature without need to utilize multiple temperature indicator sticks. That is, an operator can rub the temperature indicator stick 12 over an object to deposit a portion of the first temperature indication material 34 and a portion of the second temperature indication material 36 on the object. Due to the composite form of the temperature indicator stick 12, and the arrangement of the first temperature indication material 34 and the second temperature indication material 36 along the common interface 38, the first temperature indication material 34 and the second temperature indication material 36 can be quickly and easily deposited on the object simultaneously. When the first temperature indication material 34 melts or changes color and the second temperature indication material 36 has not yet melted or changed color, the temperature of the object has reached the first predetermined temperature but not yet exceeded the second predetermined temperature.

As described above, it is contemplated that the temperature indicator stick 12 may include at least two different temperature indication materials 34, 36. In addition, it is contemplated that in some instances it may be desirable to have a temperature indicator stick that includes three or more temperature indication materials. For example, referring now to FIGS. 4 and 5, it is contemplated that a temperature indicator stick 40 may include four distinct temperature indication materials 42, 44, 46, 48.

As addressed above, the temperature indicator stick 40 may be arranged in any of a variety of alignments within the housing 14 so as to facilitate use of each temperature indication material 42, 44, 46, 48. Additionally, although FIG. 4 shows that each temperature indication material 42, 44, 46, 48 forms an equal portion of the temperature indicator stick 40 and all meet along a common interface 50, it is contemplated that some temperature indication materials 42, 44, 46, 48 may form a greater or lesser portion of the temperature indicator stick 40 or may not extend to meet along the common interface 50.

Figure 6A:
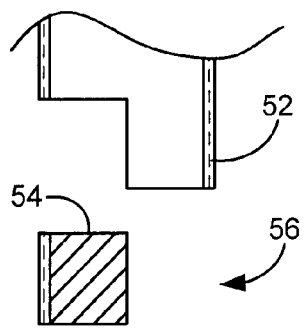
FIGS. 6*a* and 6*b* are partial side-elevational views of a system for creating a composite temperature indicator stick configured to indicate two predetermined temperatures.
Figure 6B:
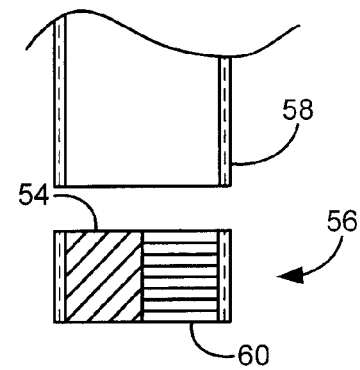
Figure 7A:
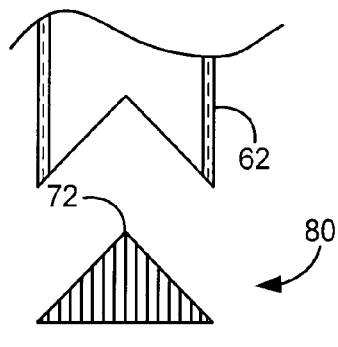
FIGS. 7*a* through 7*d* are partial side-elevational views of a system for creating a composite temperature indicator stick configured to indicate four predetermined temperatures.
Figure 7B:
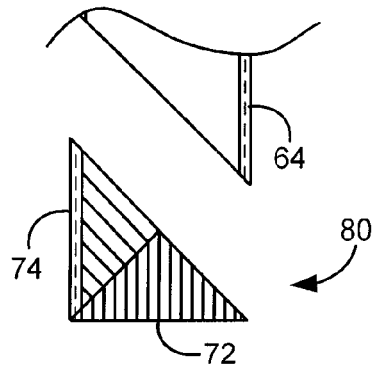
Figure 7C:
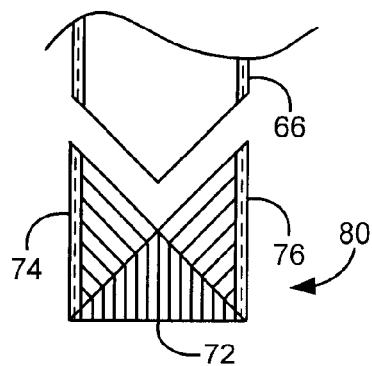
Figure 7D:
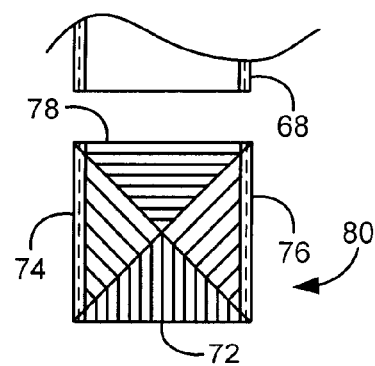

Due to the often brittle and/or fragile nature of common temperature indication materials, manufacturing a multi-temperature indication stick may be advantageously performed using molding and/or extrusion techniques. For example, referring to FIGS. 6a and 6b, a rotary die changer may be used to sequentially form each portion of a conglomerated temperature indicator stick. In particular, FIG. 6a shows a first die 52 presented by a rotary die changer to form a first portion 54 of a temperature indicator stick 56 from a first temperature indication material. In this case, FIG. 6b shows a second die 58 presented by the rotary die changer to add a second temperature indication material to form a second portion 60 of the temperature indicator stick 56.

Similarly, referring to FIGS. 7a through 7d, the rotary die changer can be utilized to control a plurality of dies 62, 64, 66, 68. Each die 62, 64, 66, 68 is designed to add a respective portion 72, 74, 76, 78 of a composite temperature indicator stick 80.

Therefore, the above-described system and method provides a conglomerate temperature indicator stick for marking an object with multiple temperature indication material. In particular, the conglomerate or multi-temperature indicator stick allows simultaneous marking of an object with two, three, four, or more temperature indication materials. Accordingly, an operator is not encumbered with the need to manipulate multiple temperature indicator sticks to accurately identify the temperature of a given object within a range defined by the desired temperature indication materials.

The present invention has been described in terms of the various embodiments, and it should be appreciated that many equivalents, alternatives, variations, and modifications, aside from those expressly stated, are possible and within the scope of the invention. Therefore, the invention should not be limited to a particular described embodiment.

We claim:

1. A multi-temperature indicator stick comprising:
an elongated stick configured to indicate at least two predetermined temperatures comprising:
a first temperature indication material configured to indicate a first predetermined temperature upon being subjected to the first predetermined temperature;
a second temperature indication material configured to indicate a second predetermined temperature upon being subjected to the second predetermined temperature; and
wherein the first temperature indication material and the second temperature indication material share a common interface extending longitudinally along the elongated stick between the first temperature indication material and the second temperature indication material.

2. The multi-temperature indicator stick of claim 1 wherein the first predetermined temperature and the second predetermined temperature are different temperatures.

3. The multi-temperature indicator stick of claim 1 further comprising:
a third temperature indication material configured to indicate a third predetermined temperature upon being subjected to the third predetermined temperature;
a fourth temperature indication material configured to indicate a fourth predetermined temperature upon being subjected to the fourth predetermined temperature; and
wherein the third temperature indication material and the fourth temperature indication material share a common interface extending longitudinally along the elongated stick.

4. The multi-temperature indicator stick of claim 3 wherein the first predetermined temperature, the second predetermined temperature, the third predetermined temperature, and the fourth predetermined temperature are different temperatures.

5. The multi-temperature indicator stick of claim 3 wherein the first temperature indication material, the second temperature indication material, the third temperature indication material, and the fourth temperature indication material each form an equal portion of the elongated stick.

6. The multi-temperature indicator stick of claim 1 wherein the first temperature indication material and the second temperature indication material are differently colored.

7. The multi-temperature indicator stick of claim 1 wherein the first temperature indication material and the second temperature indication material are configured to undergo a physical change to indicate the first and second predetermined temperatures, respectively.

8. The multi-temperature indicator stick of claim 7 wherein the physical change includes melting.

9. The multi-temperature indicator stick of claim 1 wherein the first temperature indication material and the second temperature indication material are bonded along the common interface through at least one of a molded bond and an extruded bond.

10. The multi-temperature indicator stick of claim 1 further comprising at least one textured surface arranged along the elongated stick to facilitate positional control of the elongated stick.

11. The multi-temperature indicator stick of claim 10 wherein the at least one textured surface forms at least one rack configured to be engaged by teeth of at least one gear to cause linear motion of the temperature indicator stick along a longitudinal axis as the at least one gear is rotated.

12. A method for manufacturing a multi-temperature indicator stick, the method comprising the steps of:
forming a first temperature indication material configured to indicate a first predetermined temperature upon being subjected to the first predetermined temperature into a first elongated body;
forming a second temperature indication material configured to indicate a second predetermined temperature upon being subjected to the second predetermined temperature into a second elongated body; and
wherein the first elongated body and the second elongated body share a common interface extending longitudinally along the first elongated body and the second elongated body to form a conglomerated stick.

13. The method of claim 12 wherein the step of forming the first temperature indication material and the step of forming the second temperature indication material includes at least one of extruding and molding the first temperature indication material and second temperature indication material along the common interface using a plurality of dies controlled by a rotary die changer.

14. The method of claim 12 further comprising the steps of:
forming a third temperature indication material configured to indicate a third predetermined temperature upon being subjected to the third predetermined temperature into a third elongated body; and
wherein the first elongated body, the second elongated body, and the third elongated body share a common interface extending longitudinally along the first elongated body, the second elongated body, and the third elongated body to form the conglomerated stick.

15. The method of claim 14 further comprising the steps of:
forming a fourth temperature indication material configured to indicate a fourth predetermined temperature upon being subjected to the fourth predetermined temperature into a fourth elongated body; and
wherein the first elongated body, the second elongated body, the third elongated body, and the fourth elongated body share a common interface extending longitudinally along the first elongated body, the second elongated body, the third elongated body, and the fourth elongated body to form the conglomerated stick.

16. The method of claim 12 further comprising the steps of forming at least one textured surface along the conglomerated stick.

17. The method of claim 16 wherein the step of forming at least one textured surface includes forming at least one rack along at least one surface of the conglomerated stick to be engaged by teeth of at least one gear to cause linear motion of the temperature indicator stick along a longitudinal axis as the at least one gear is rotated.

18. A temperature indicator stick configured to indicate multiple temperatures comprising:
an elongated stick configured to indicate at least two predetermined temperatures comprising:
a first temperature indication material configured to undergo a physical change upon being subjected to a first predetermined temperature to indicate the first predetermined temperature;
a second temperature indication material configured to undergo a physical change upon being subjected to a second predetermined temperature to indicate the second predetermined temperature; and
wherein the first temperature indication material and the second temperature indication material extend along a length of the elongated stick to present a portion of the first temperature indication material and the second temperature indication material at each latitudinal cross section of the elongated stick.

19. The temperature indicator stick of claim 18 wherein the first predetermined temperature and the second predetermined temperature are different temperatures.

20. The temperature indicator stick of claim 18 further comprising a housing at least partially surrounding the elongated stick.

* * * * *

UNITED STATES PATENT AND TRADEMARK OFFICE
CERTIFICATE OF CORRECTION

| | | |
|---|---|---|
| PATENT NO. | : 7,618,184 B2 | Page 1 of 1 |
| APPLICATION NO. | : 11/556376 | |
| DATED | : November 17, 2009 | |
| INVENTOR(S) | : Gosis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 187 days.

Signed and Sealed this

Nineteenth Day of October, 2010

David J. Kappos
*Director of the United States Patent and Trademark Office*